Sept. 25, 1951 F. E. OSIKA 2,568,820

RELEASABLE HOOK

Filed May 4, 1951

INVENTOR
FRANK E. OSIKA

BY
McMorrow, Berman + Davidson
ATTORNEY

Patented Sept. 25, 1951

2,568,820

UNITED STATES PATENT OFFICE 2,568,820

RELEASABLE HOOK

Frank E. Osika, Mosinee, Wis.

Application May 4, 1951, Serial No. 224,542

4 Claims. (Cl. 294—83)

This invention relates to releasable hooks, and more particularly to a chain or cable hook which can be engaged or released while the associated chain or cable is under tension.

It is among the objects of the invention to provide an improved releasable hook which can be engaged with or released from an associated chain or cable while the chain or cable is under tension by a simple manual rotation of one part of the hook relative to an associated part; which will easily release a chain or cable while the chain or cable is under severe tension, but will resist the tensional load on an associated chain or cable without distortion and without danger of accidental release; which may be provided in various sizes for different operating conditions; and which is strong and durable in construction, economical to manufacture and positive and effective in operation.

Other objects and advantages will become apparent from a consideration of the following description and the appended claims in conjunction with the accompanying drawing, wherein:

Figure 1:
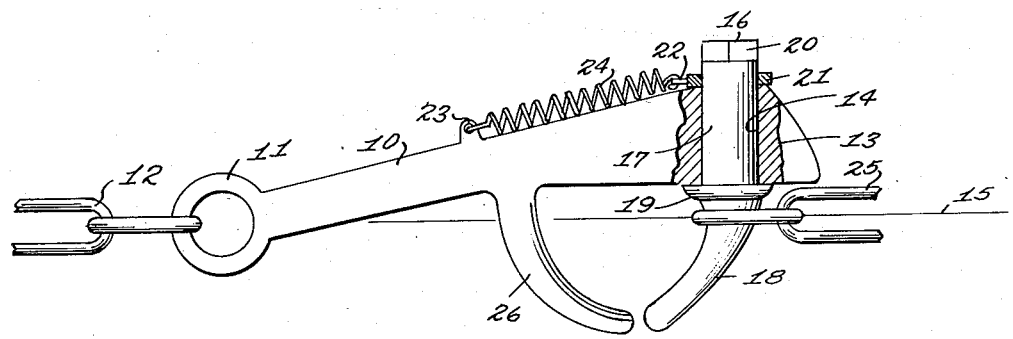
Figure 1 is a side elevational view of a releasable hook illustrative of the invention, a portion being broken away and shown in cross-section to better illustrate the construction thereof.
Figure 2:
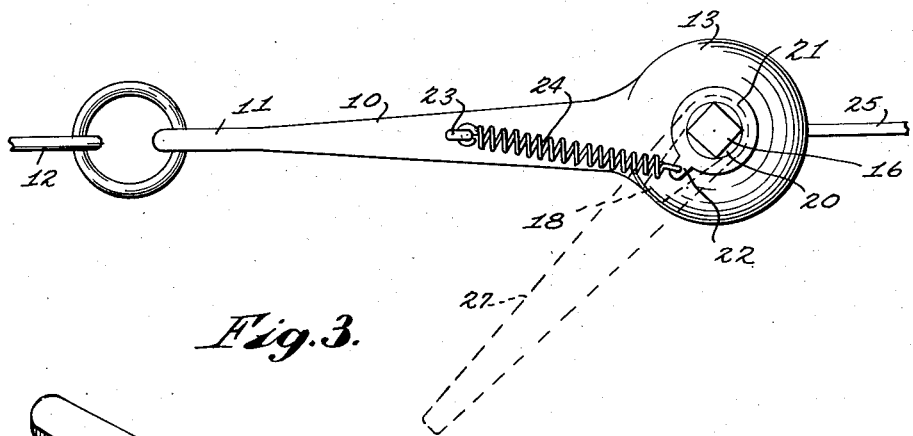
Figure 2 is a top plan view of the releasable hook illustrated in Figure 1.

With continued reference to the drawing, the hook comprises an elongated shank 10 having at one end an eye formation 11 engageable with one end of a flexible strand, such as the link chain 12. At its other end the shank has a thickened portion 13 provided with a transversely extending bearing aperture 14, the longitudinal center line of which is perpendicular to the line of pull on the hook, as indicated by the line 15 which extends from the center of the eye formation 11 along one side of the shank 10 past the corresponding end of the aperture 14 and spaced from the thickened portion of the shank.

A rotatable pin 16 has a cylindrical bearing portion 17 received in and extending through the bearing aperture 14. At one end of the bearing portion 17 the pin has a longitudinally curved end portion 18 tapered in a direction away from the corresponding end of the bearing portion and has an integral bead or collar formation 19 at the end of the bearing portion from which the end portion 18 extends, which formation provides an annular shoulder bearing against the adjacent surface of the shank 10 surrounding the corresponding end of the aperture 14. At the other end of the bearing portion the pin is provided with a squared or non-circular formation 20 which is adapted to receive the lever illustrated in Figure 3, or a suitable wrench for rotating the pin 16 relative to the shank 10.

An annular washer or collar 21 is secured on the bearing portion 17 of the pin at the end of the bearing aperture 14 remote from the annular formation 19, and this collar also bears on the adjacent surface of the shank surrounding the corresponding end of the aperture 14, the collar 21 and annular formation 19 restraining the bearing portion 17 of the pin against longitudinal movement relative to the shank of the hook.

An apertured lug 22 projects radially from the collar 21 and an apertured lug 23 projects from the side of the shank 10 adjacent the collar 21 and intermediate the length of the shank. A coil tension spring 24 is connected at one end to the lug 22 and at its other end to the lug 23 and resiliently urges the pin 16 to a rotational position in which the distal end of the curved end portion 18 of the pin is directed toward the eye formation 11 of the shank, as is particularly illustrated in Figure 1.

The curved end portion 18 of the pin 16 receives one end of a flexible strand 25 which may be the same strand connected at its other end to the eye 11, or may be an entirely different strand depending upon the use of the hook. It will be noted that the pull line 15 extends along the center line of the strands 12 and 25 when the strands are under tension.

A longitudinally curved guard 26 extends from the side of the shank 10 adjacent the curved end portion 18 of the pin 16 at a location intermediate the length of the shank and this guard is tapered in a direction away from the shank and curved toward the distal end of the curved end portion 18 of the pin.

When the pin is in the chain-engaging rotational position illustrated in Figure 1, the distal ends of the end portion 18 of the pin and of the guard 26 are spaced apart a distance insufficient for the chain link or ring receiving the curved end portion of the pin to pass between the distal ends of the curved end portions of the pin and the guard so that the chain is retained by the hook even though the chain should be slackened.

Figure 3:
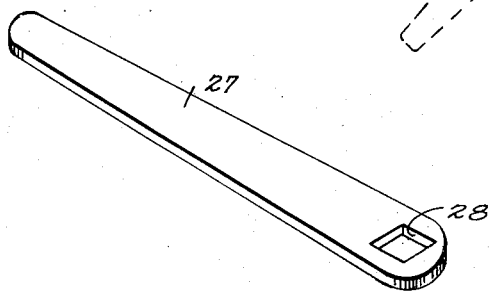
Figure 3 is a perspective view of a hand lever for operating the hook.

The hand lever 27, particularly illustrated in Figure 3, is an elongated, flat bar having near one end an aperture 28 of substantially the same size and shape as the non-circular end portion 20 on the pin 16. This hand lever may be permanently connected with the non-circular end portion of the pin, if desired, or may be maintained separable from the pin if the latter condition is found more convenient. If the special hand lever is not available, a suitable wrench may be applied to the squared end portion of the pin to rotate the latter.

When the pin is in the rotational position illustrated in Figure 1, the strand ends engaged by the hook are held together against accidental release, and against tensional loads applied to the strands. When the pin 16 is rotated through an angular interval of slightly more than 90°, the strand end engaged with the curved end portion of the pin will slide off of this curved end portion and be released from the hook.

In order to engage the hook with a strand end while the strand is under tension, the pin is manually rotated through an angular interval of somewhat more than 90° from the rotational position illustrated in Figure 1, and the distal end of the curved end portion 18 of the pin inserted through the end link, ring or loop of the strand. The pin may then be manually rotated to turn it back to its engaging position, as illustrated in Figure 1, causing the link, ring or loop engaged by the pin to slide along the curved end portion of the pin from the distal end of the latter to a location adjacent the annular formation 19, whereupon the strand end is securely engaged by the hook. The angular relationship between the longitudinal center line of the pin 16 and the line of pull between the two strand ends eliminates any danger of the strand end engaged with the pin sliding off of the curved end portion of the pin and becoming accidentally disengaged from the hook, while the strand is under tension.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A releasable hook comprising an elongated shank having an eye formation at one end and a thickened portion at its other end, said thickened portion having a bearing aperture extending therethrough with its center line perpendicular to a line extending from the center of said eye formation past one end of said aperture, a pin having a bearing portion journaled in said bearing aperture and having a curved end portion tapered from the end of said bearing portion at said one end of said bearing aperture, said pin having means providing an annular shoulder at the end of said bearing portion from which said end portion extends and a non-circular formation at the other end of said bearing portion, a collar secured on the bearing portion of said pin at the end of said bearing aperture remote from the means providing said annular shoulder, a lug on said collar, a lug on said shank intermediate the length of the latter, a spring connected between said lugs and resiliently urging said pin to a rotational position relative to said shank in which the distal end of the curved end portion of said pin is directed toward said eye formation, and an outwardly tapered guard extending from said shank at a location intermediate the length of the latter and curved toward the distal end of the curved end portion of said pin, said non-circular formation being adapted to receive a hand lever for manually rotating said pin relative to said shank to engage the curved end portion of said pin with or release it from an end of a strand while the strand is under tension.

2. A releasable hook comprising an elongated shank having a strand-engaging formation at one end and a bearing aperture extending transversely therethrough near its other end, a pin having a bearing portion journaled in said bearing aperture, and having a longitudinally curved portion extending from one end of said bearing portion and a non-circular formation at the other end of said bearing portion, and resilient means connected between said pin and said shank urging said pin to a rotational position relative to said shank in which the distal end of the longitudinally curved portion of said pin is directed toward the strand-engaging formation on said shank, the non-circular formation on said pin being adapted to receive a hand lever for manually rotating said pin away from the above-mentioned rotational position.

3. A releasable hook comprising an elongated shank having a strand-engaging formation at one end and a bearing aperture extending transversely therethrough near its other end, a pin having a bearing portion journaled in said bearing aperture, and having a longitudinally curved portion extending from one end of said bearing portion and a non-circular formation at the other end of said bearing portion, and resilient means connected between said pin and said shank urging said pin to a rotational position relative to said shank in which the distal end of the longitudinally curved portion of said pin is directed toward the strand-engaging formation on said shank, the non-circular formation on said pin being adapted to receive a hand lever for manually rotating said pin away from the above-mentioned rotational position, and means on said pin providing annular shoulders disposed one at each end of the bearing aperture in said shank restraining said pin against longitudinal movement relative to said shank.

4. A releasable hook comprising an elongated shank having a strand-engaging formation at one end and a bearing aperture extending transversely therethrough near its other end, a pin having a bearing portion journaled in said bearing aperture, and having a longitudinally curved portion extending from one end of said bearing portion and a non-circular formation at the other end of said bearing portion, and resilient means connected between said pin and said shank urging said pin to a rotational position relative to said shank in which the distal end of the longitudinally curved portion of said pin is directed toward the strand-engaging formation on said shank, the non-circular formation on said pin being adapted to receive a hand lever for manually rotating said pin away from the above-mentioned rotational position, means on said pin providing annular shoulders disposed one at each end of the bearing aperture in said shank restraining said pin against longitudinal movement relative to said shank, and a longitudinally curved guard extending from the side of said shank adjacent the longitudinally curved portion of said pin at a location intermediate the length of said shank and having its distal end disposed adjacent the distal end of the longitudinally curved portion of said pin when said pin is in said above-mentioned rotational position.

FRANK E. OSIKA.

No references cited.